(12) United States Patent
Bryce et al.

(10) Patent No.: US 7,484,514 B2
(45) Date of Patent: Feb. 3, 2009

(54) WASHING A CORDED LETTUCE HEAD

(75) Inventors: John Y. Bryce, Salinas, CA (US);
Rafael Garibay, Salinas, CA (US)

(73) Assignee: Dole Fresh Vegetables, Inc., Salinas, CA (US)

( * ) Notice: Subject to any disclaimer, the term of this patent is extended or adjusted under 35 U.S.C. 154(b) by 0 days.

(21) Appl. No.: 11/869,613

(22) Filed: Oct. 9, 2007

(65) Prior Publication Data

US 2008/0023041 A1    Jan. 31, 2008

Related U.S. Application Data

(62) Division of application No. 10/745,905, filed on Dec. 23, 2003, now Pat. No. 7,278,433.

(60) Provisional application No. 60/499,073, filed on Feb. 20, 2003.

(51) Int. Cl.
*B08B 3/02* (2006.01)
(52) U.S. Cl. .................................. 134/22.1; 134/22.18
(58) Field of Classification Search ............... 134/22.1, 134/166 R
See application file for complete search history.

(56) References Cited

U.S. PATENT DOCUMENTS

| | | | |
|---|---|---|---|
| 910,882 A | 1/1909 | Truesdell | |
| 1,156,809 A | 10/1915 | Valerius | |
| 1,661,602 A | 3/1928 | Dary | |
| 1,714,313 A | * 5/1929 | Meisler | 99/623 |
| 1,799,819 A | 4/1931 | Aage | |
| 2,003,326 A | 6/1935 | Wellman | |
| 2,170,378 A | 8/1939 | Orstrom | |
| 2,214,944 A | 9/1940 | Vogt | |
| 2,250,131 A | 7/1941 | Miller | |
| 2,294,688 A | 9/1942 | Karas | |
| 2,322,417 A | 6/1943 | Jack | |
| 2,335,913 A | 12/1943 | Buttery | |
| 2,399,205 A | 4/1946 | Campbell | |
| 2,424,693 A | 7/1947 | Jones | |

(Continued)

FOREIGN PATENT DOCUMENTS

CA    1025786 A    2/1978

(Continued)

OTHER PUBLICATIONS

Brody et al. (1986). *The Wiley Encyclopedia of Packaging Technology*. Marilyn Bakker ed., New York: John Wiley & Sons, Inc., pp. 24-29, 66-81, 493, 494.

(Continued)

*Primary Examiner*—Frankie L Stinson
(74) *Attorney, Agent, or Firm*—Morrison & Foerster LLP

(57) ABSTRACT

A produce washer includes a holder to position a single piece of produce and a nozzle disposed at a horizontal distance adjacent to the holder. When the produce is a cored lettuce head, the cored lettuce head is positioned in the holder with the cored portion facing the nozzle disposed across the horizontal distance. When the cored lettuce head is positioned in the holder, the nozzle directs a stream of cleansing liquid across the horizontal distance into the cored portion.

20 Claims, 9 Drawing Sheets

U.S. PATENT DOCUMENTS

Figure 1:
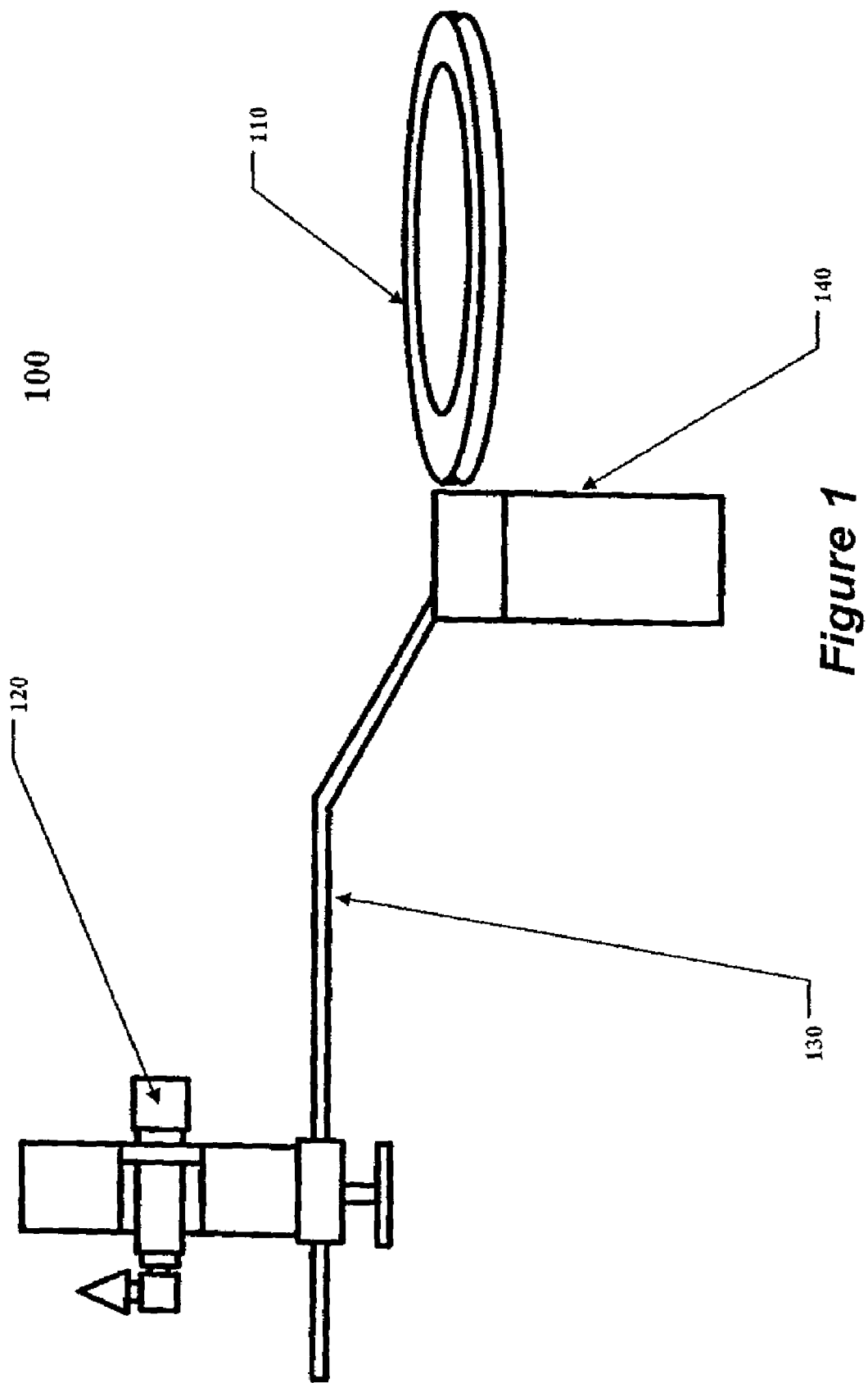

| | | | |
|---|---|---|---|
| 2,611,709 A | 9/1952 | Plagge | |
| 2,627,862 A | 2/1953 | Flusher | |
| 2,703,124 A * | 3/1955 | Buck | 99/483 |
| 2,754,835 A | 7/1956 | Casady | |
| 2,815,621 A | 12/1957 | Carter | |
| 2,920,967 A | 1/1960 | Heinemann | |
| 2,925,210 A | 2/1960 | Fallert | |
| 2,955,940 A | 10/1960 | Williams | |
| 2,967,777 A | 1/1961 | Grindrod | |
| 3,022,790 A | 2/1962 | Carrie | |
| 3,055,408 A * | 9/1962 | Harrer et al. | 99/543 |
| 3,055,568 A | 9/1962 | Zalking | |
| 3,117,605 A * | 1/1964 | Creed et al. | 426/484 |
| 3,128,934 A | 4/1964 | Jacke | |
| 3,203,437 A | 8/1965 | Faust | |
| 3,204,825 A | 9/1965 | Underwood | |
| 3,220,157 A | 11/1965 | Buchner | |
| 3,261,533 A | 7/1966 | Ripking | |
| 3,407,078 A | 10/1968 | Schlichter | |
| 3,419,400 A | 12/1968 | Hayhurts et al. | |
| 3,450,542 A | 6/1969 | Badran | |
| 3,451,328 A | 6/1969 | Swett | |
| 3,473,589 A | 10/1969 | Gotz | |
| 3,484,017 A | 12/1969 | O'Donnell | |
| 3,521,806 A | 7/1970 | Esty | |
| 3,715,860 A | 2/1973 | Esty | |
| 3,747,614 A | 7/1973 | Buedingen | |
| 3,937,850 A * | 2/1976 | Farha et al. | 426/484 |
| 3,939,287 A | 2/1976 | Orwig et al. | |
| 3,945,558 A | 3/1976 | Elder | |
| 3,957,179 A | 5/1976 | Bamburg et al. | |
| 3,990,358 A | 11/1976 | Cade | |
| 3,991,543 A | 11/1976 | Shaw | |
| 4,001,443 A | 1/1977 | Dave | |
| 4,006,561 A | 2/1977 | Toma et al. | |
| 4,039,350 A | 8/1977 | Bucy | |
| 4,055,931 A | 11/1977 | Myers | |
| 4,061,785 A | 12/1977 | Nishimo et al. | |
| 4,066,401 A | 1/1978 | Solomon | |
| 4,079,152 A | 3/1978 | Bedrosian et al. | |
| 4,089,417 A | 5/1978 | Osborne | |
| 4,105,153 A | 8/1978 | Locke | |
| 4,168,597 A | 9/1979 | Cayton | |
| 4,173,051 A | 11/1979 | Reid | |
| 4,209,538 A | 6/1980 | Woodruff | |
| 4,224,347 A | 9/1980 | Woodruff | |
| 4,241,558 A | 12/1980 | Gidewall et al. | |
| 4,258,848 A | 3/1981 | Akao et al. | |
| 4,268,555 A | 5/1981 | Kantz | |
| 4,296,860 A | 10/1981 | Hsu et al. | |
| 4,343,429 A | 8/1982 | Cherry | |
| 4,411,921 A | 10/1983 | Woodruff | |
| 4,422,466 A | 12/1983 | Schaffer | |
| 4,423,080 A | 12/1983 | Bedrosian et al. | |
| 4,452,264 A | 6/1984 | Kreisel et al. | |
| 4,454,945 A | 6/1984 | Jabarin | |
| 4,515,266 A | 5/1985 | Myers | |
| 4,516,692 A | 5/1985 | Croley | |
| 4,610,885 A | 9/1986 | Tait | |
| 4,670,227 A | 6/1987 | Smith | |
| 4,702,408 A | 10/1987 | Powlenko | |
| 4,744,199 A | 5/1988 | Gannon | |
| 4,744,203 A | 5/1988 | Brockwell et al. | |
| 4,756,417 A | 7/1988 | Teixeira | |
| 4,759,642 A | 7/1988 | Van Erden et al. | |
| 4,813,791 A | 3/1989 | Cullen et al. | |
| 4,840,271 A | 6/1989 | Garwood | |
| 4,863,287 A | 9/1989 | Marisk | |
| 4,886,372 A | 12/1989 | Greengrass et al. | |
| 4,930,906 A | 6/1990 | Hemphill | |
| 4,962,777 A | 10/1990 | Bell | |
| 4,963,287 A | 10/1990 | Hutchings et al. | |
| 4,967,776 A | 11/1990 | Folmar | |
| 5,000,206 A | 3/1991 | Kramer et al. | |
| 5,044,776 A | 9/1991 | Schramer et al. | |
| 5,078,509 A | 1/1992 | Center et al. | |
| 5,093,080 A | 3/1992 | Keller | |
| 5,121,589 A | 6/1992 | Ventura et al. | |
| 5,226,972 A | 7/1993 | Bell | |
| 5,290,580 A | 3/1994 | Floyd et al. | |
| 5,316,778 A | 5/1994 | Hougham | |
| 5,346,089 A | 9/1994 | Brown et al. | |
| 5,354,569 A | 10/1994 | Brown et al. | |
| 5,357,993 A | 10/1994 | St. Martin | |
| 5,402,906 A | 4/1995 | Brown et al. | |
| 5,409,026 A | 4/1995 | St. Martin | |
| 5,421,250 A | 6/1995 | Beaumont | |
| 5,437,731 A | 8/1995 | St. Martin | |
| 5,522,410 A | 6/1996 | Meilleur | |
| 5,536,329 A | 7/1996 | St. Martin | |
| 5,551,461 A | 9/1996 | St. Martin | |
| 5,562,114 A | 10/1996 | St. Martin | |
| 5,590,591 A | 1/1997 | Kim | |
| 5,640,643 A | 6/1997 | Hoitz et al. | |
| 5,713,101 A | 2/1998 | Jackson | |
| 5,727,690 A | 3/1998 | Hofmeister | |
| 5,728,439 A | 3/1998 | Carlblom et al. | |
| 5,820,694 A | 10/1998 | St. Martin | |
| 5,885,002 A | 3/1999 | Reiss | |
| 5,954,067 A | 9/1999 | Brown et al. | |
| 5,992,310 A | 11/1999 | Castro | |
| 6,032,683 A | 3/2000 | Casey et al. | |
| 6,041,797 A | 3/2000 | Casselman | |
| 6,068,005 A | 5/2000 | Diamond et al. | |
| 6,112,429 A | 9/2000 | Mitchell et al. | |
| 6,196,237 B1 | 3/2001 | Brown et al. | |
| 6,262,192 B1 | 7/2001 | Wu | |
| 6,276,375 B1 | 8/2001 | Brown et al. | |
| 6,378,535 B1 | 4/2002 | Miyachi et al. | |
| 6,622,467 B1 * | 9/2003 | Ottaway | 56/327.1 |
| 6,626,192 B2 | 9/2003 | Garcia et al. | |
| 2003/0217650 A1 * | 11/2003 | Herrera | 99/547 |
| 2004/0149545 A1 | 8/2004 | Tarantino et al. | |
| 2005/0199139 A1 * | 9/2005 | Elliot | 99/536 |

FOREIGN PATENT DOCUMENTS

| | | | |
|---|---|---|---|
| DE | 100 27 781 | * | 8/2001 |
| FR | 2645775 A1 | | 10/1990 |
| GB | 402436 A | | 12/1933 |
| GB | 764796 A | | 1/1957 |
| GB | 1378140 A | | 12/1974 |
| GB | 2231776 A | | 11/1990 |
| JP | 60126032 A | | 7/1985 |
| JP | 11-243934 | * | 9/1999 |
| JP | 2001-238613 | * | 9/2001 |
| SU | 1479063 | * | 5/1989 |

OTHER PUBLICATIONS

"Nature-fresh in Latex." (Aug. 1941). *Modern Packaging* 14(12):44-45.

"Research on Quality Preservation Technique for Cut Vegetable Closed Up by Rapid Development of Catering Industry." (Nov. 1985). *Packaging Japan*, pp. 17-22.

"The King PAK Eight Sided Fiberboard IBC." (May 1980). *Packaging Review*, pp. 97, 99-101.

* cited by examiner

WASHING A CORDED LETTUCE HEAD

CROSS REFERENCE TO RELATED APPLICATION

This application is a Divisional of U.S. patent application Ser. No. 10/745,905, entitled WASHING A CORED LETTUCE HEAD, filed on Dec. 23, 2003, which claims the benefit of an earlier filed provisional application U.S. Provisional Application Ser. No. 60/449,073, entitled A METHOD AND APPARATUS FOR WASHING A CORED LETTUCE HEAD, filed on Feb. 20, 2003, which is incorporated herein by reference in their entireties for all purposes.

BACKGROUND

1. Field of the Invention

The present application relates to the preparation of produce for processing. More specifically, the present application relates to washing a cored lettuce head.

2. Related Art

A major market has been found for pre-made salads, usually marketed in plastic bags. The lettuce for such pre-made salads needs to be washed before it can be incorporated. The mass production of such salads requires the lettuce to be washed on a mass production scale.

U.S. Pat. No. 5,954,067, U.S. Pat. No. 6,196,237, and U.S. Pat. No. 6,276,375 describe one apparatus for washing such salads, which includes a perforated platform connected to and supporting a tripod, or other lettuce head guide, that fits into the core hole. The guide includes three L-shaped vanes that project from the support platform. The platform includes supports for a lettuce head holder. The holder has an opening sufficiently large to permit the guide to project through the opening with the holder in a first position over the guide. The opening in the holder includes, near the top of the holder, a recess, preferably of sufficient size and shape to receive and support a cored head of lettuce. In a first position, a core hole of the cored head of lettuce is placed over the guide and into the recess of the holder, with the lettuce head otherwise resting in the recess of the holder. A nozzle at the proximal end of a siphon discharges a spray of aqueous solution vertically into and through the area within the guide, and into and around the cored area of a lettuce head to wash the head efficiently.

The holder is pivotally connected to two holder supports. The two holder supports are connected to the support platform so that the holder can move upwardly from the first, horizontal position, where the guide projects through the opening in the holder, to a second raised position at a distance of 45 to 75 degrees from the first position. This movement to a second position unseats the cored area of the lettuce head from the guide and propels the lettuce head onto a conveyor that carries the cored washed lettuce head from the washing apparatus.

Disadvantageously, the holder pushes the lettuce to unseat the cored area of the lettuce head from the guide and propel the lettuce head on the conveyer. Such a pushing configuration applies an amount of force against the lettuce head, which may be sufficient to bruise or otherwise damage the lettuce head. Additionally, the chamber houses various moving parts and a complex pressurizing system, which is relatively costly to manufacture and may be costly to maintain.

SUMMARY

In one exemplary embodiment, a produce washer for washing a cored head of lettuce with a cored portion includes a holder to position a single piece of cored head of lettuce and a nozzle disposed at a horizontal distance adjacent to the holder. The cored head of lettuce is positioned in the holder with the cored portion of the cored head of lettuce facing the nozzle disposed across the horizontal distance. When the cored head of lettuce is positioned in the holder, the nozzle directs a stream of cleansing liquid across the horizontal distance into the cored portion.

DESCRIPTION OF DRAWING FIGURES

The present application can be best understood by reference to the following description taken in conjunction with the accompanying drawing figures, in which like parts may be referred to by like numerals:

FIG. 1 provides an illustration of one embodiment of a produce washer.

Figure 2:
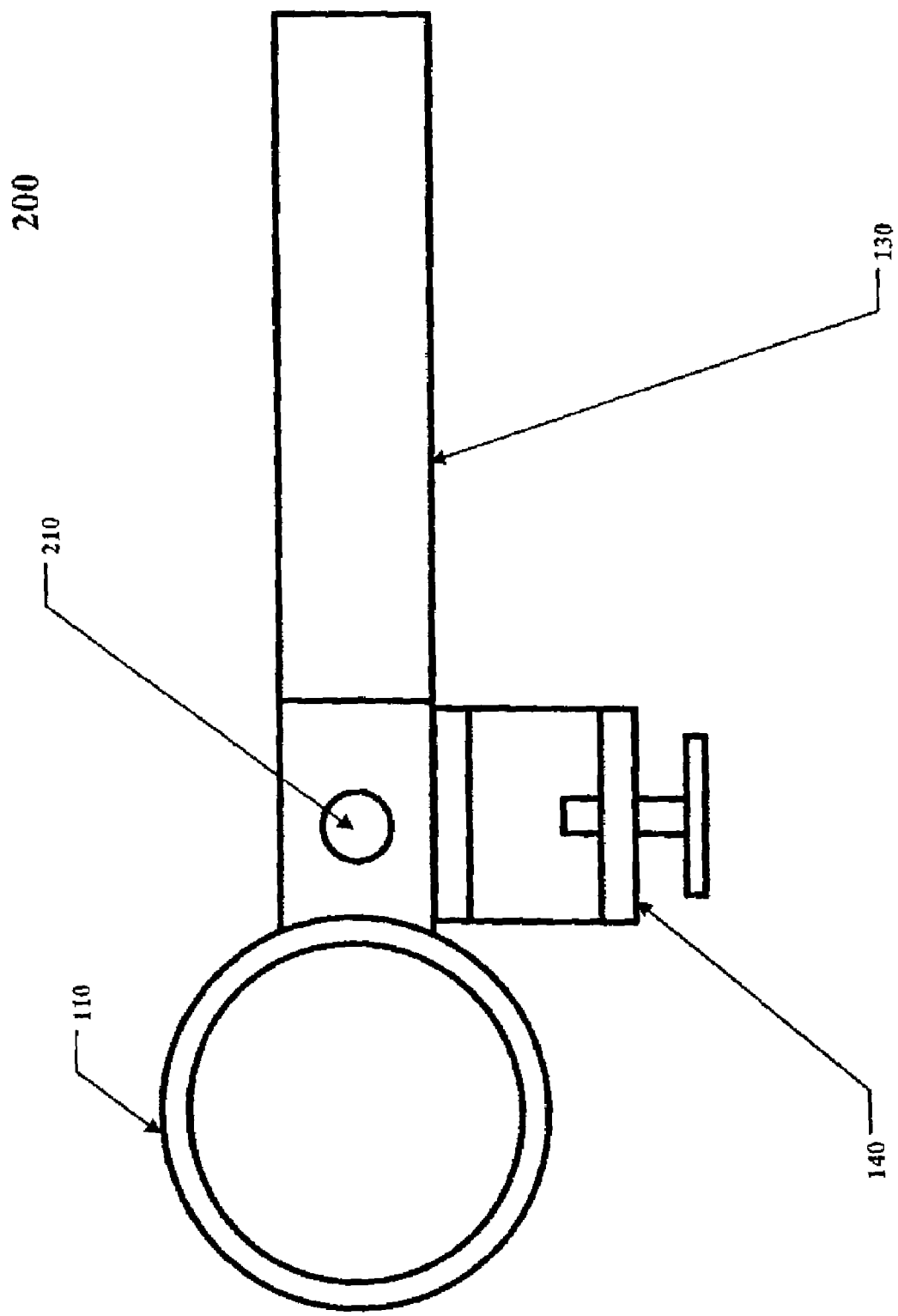

FIG. 2 provides an illustration of one embodiment of a holder.

Figure 3:
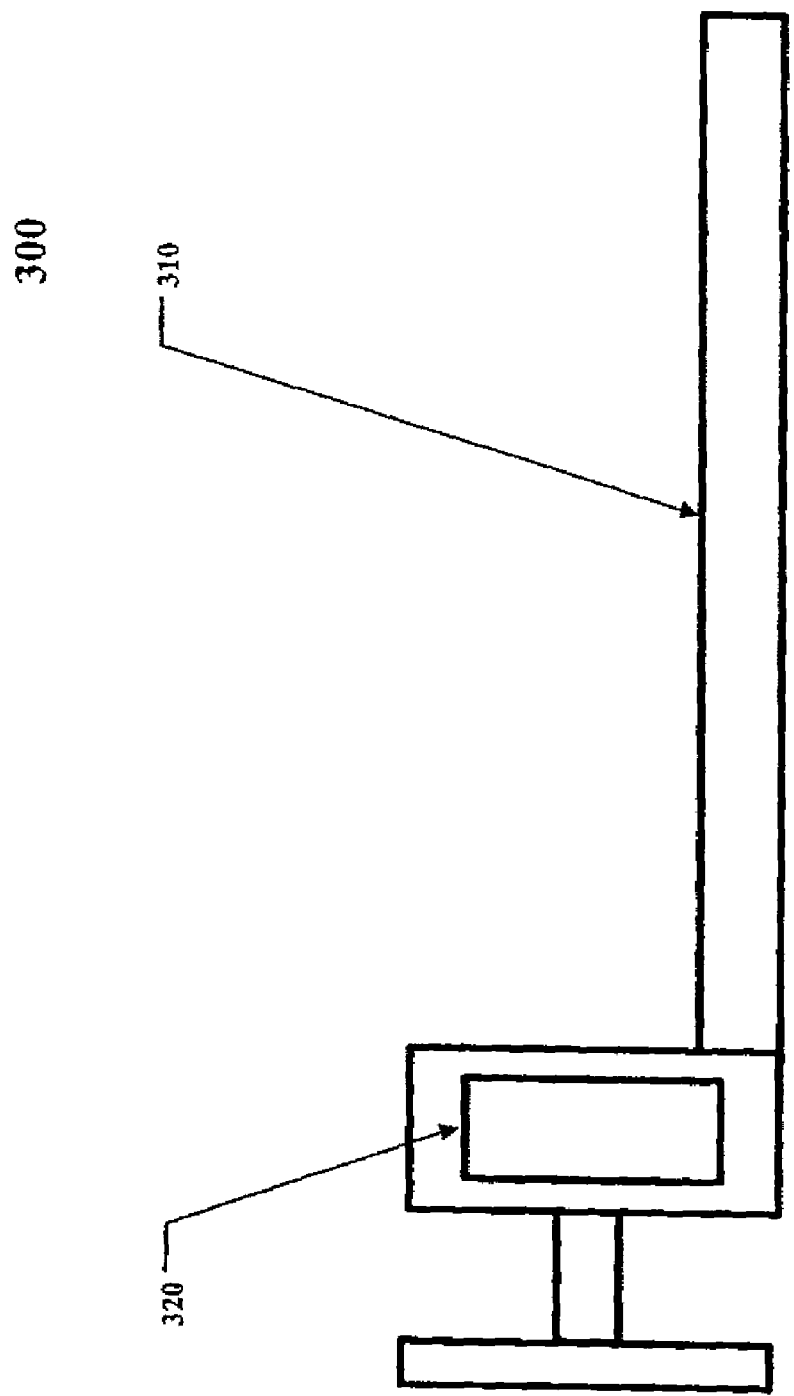

FIG. 3 provides an illustration of one embodiment of a nozzle support.

Figure 4:
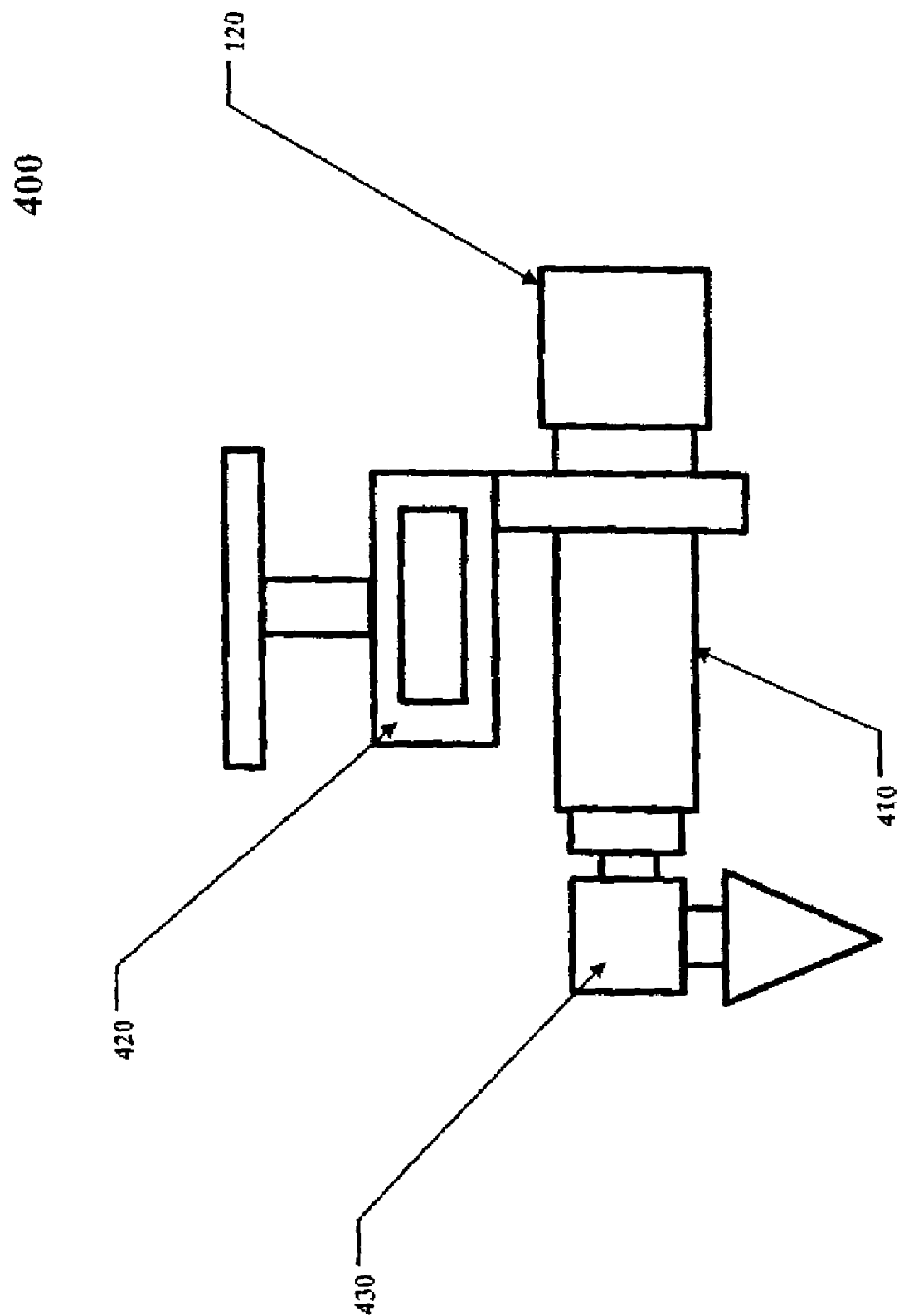

FIG. 4 provides an illustration of one embodiment of a nozzle attachment.

Figure 5:
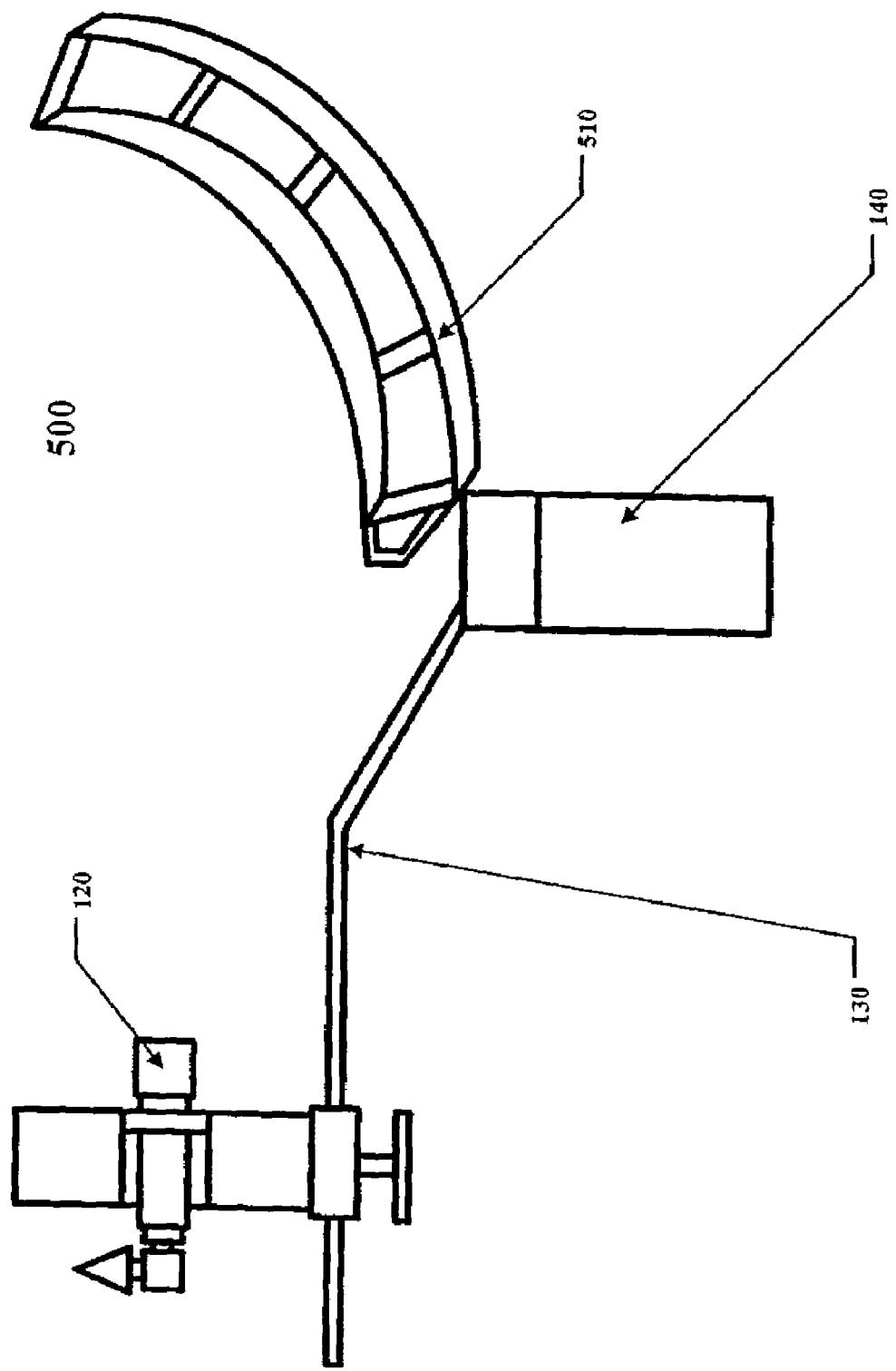

FIG. 5 provides an illustration of a second embodiment of a produce washer.

Figure 6:
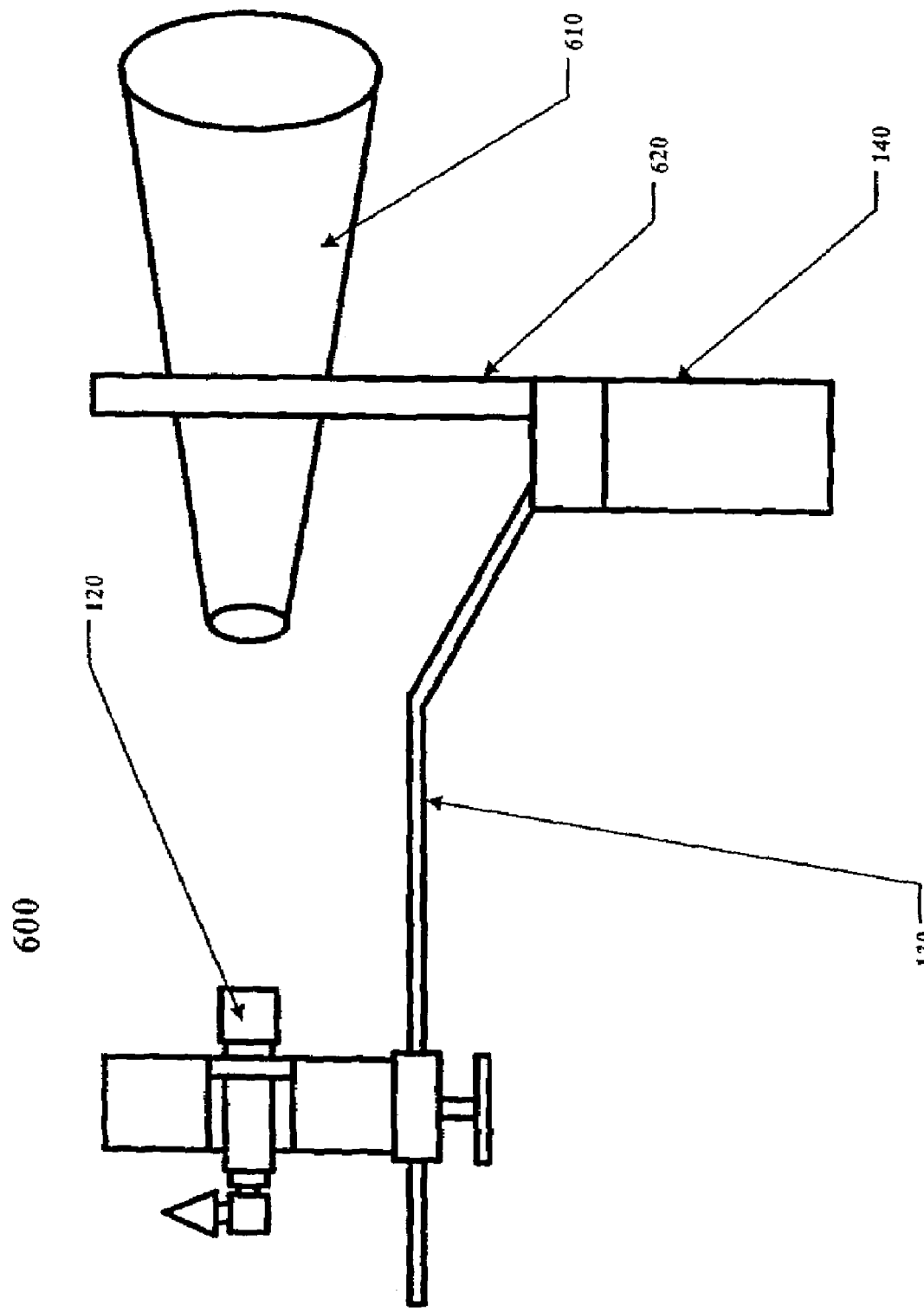

FIG. 6 provides an illustration of a third embodiment of a produce washer.

Figure 7:
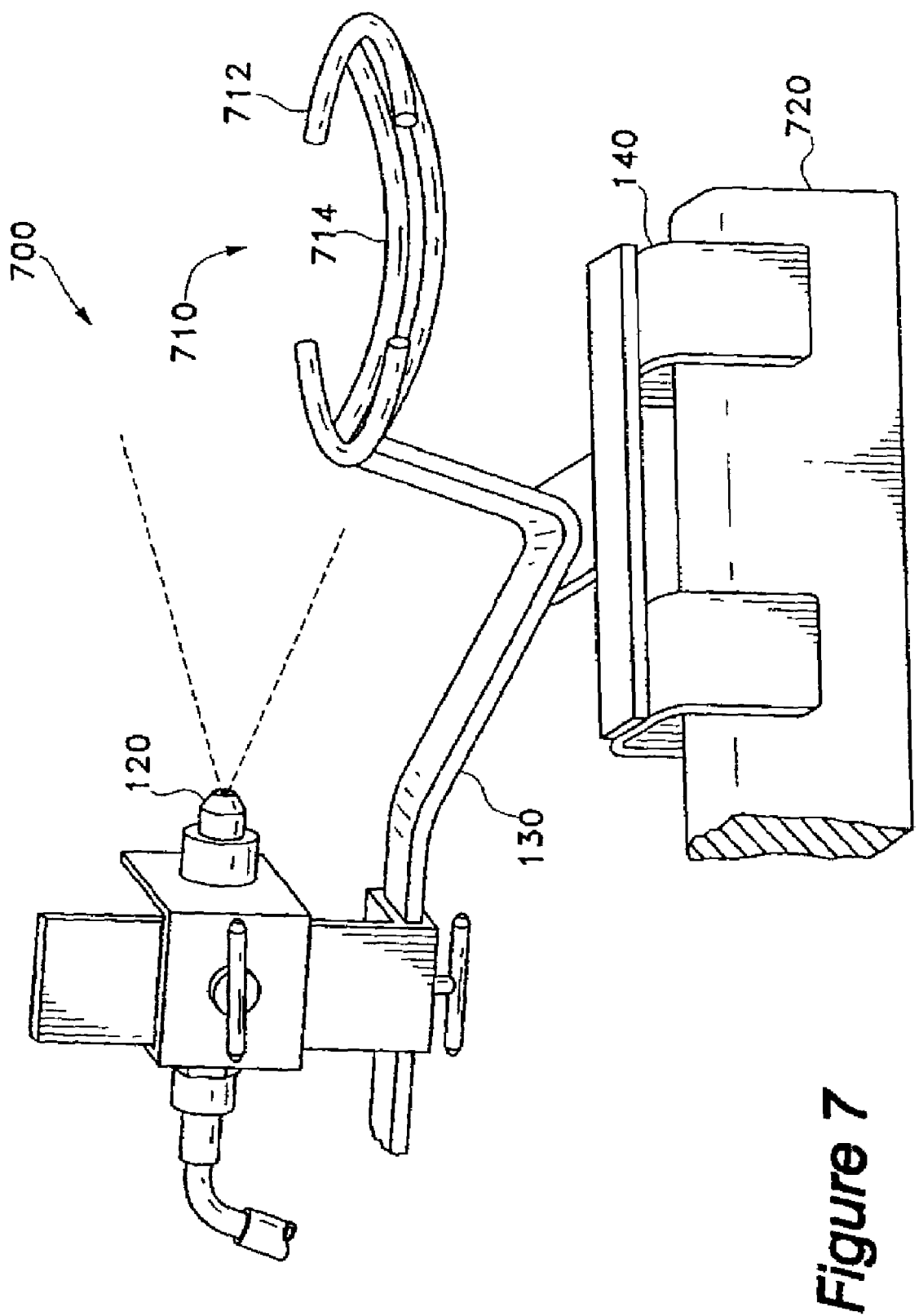

FIG. 7 provides an illustration of a fourth embodiment of a produce washer.

Figure 8:
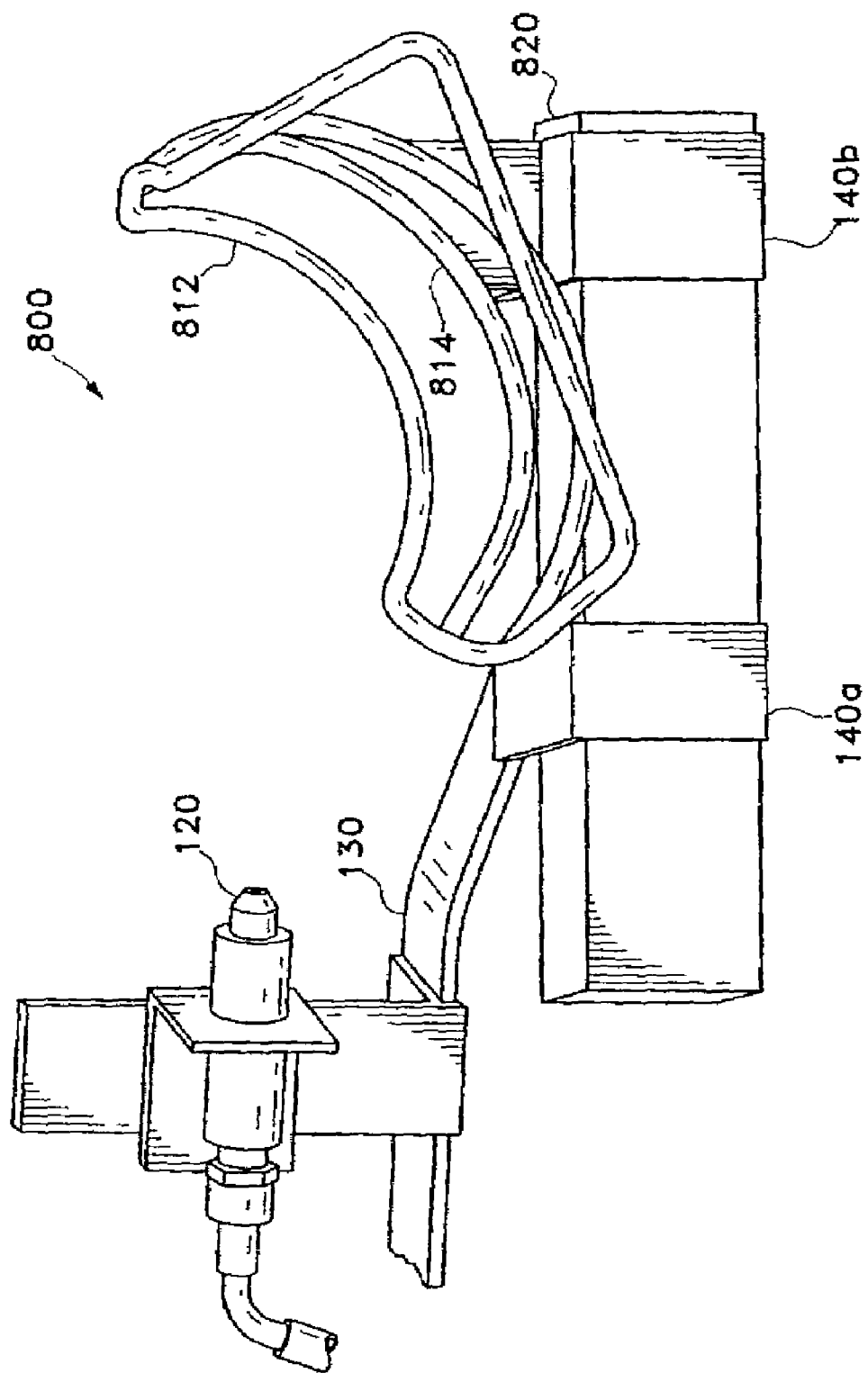

FIG. 8 provides an illustration of a fifth embodiment of a produce washer.

Figure 9:
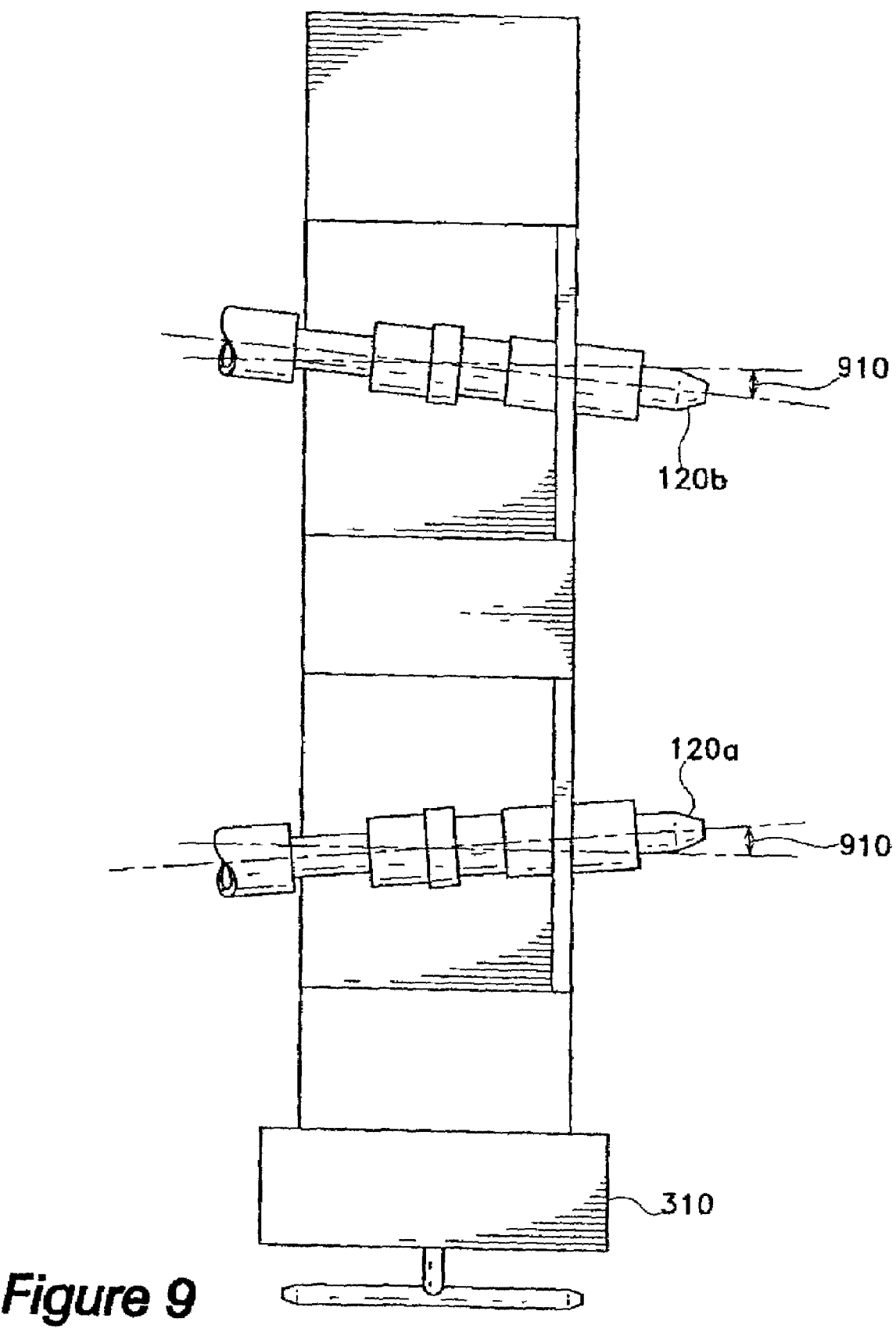

FIG. 9 provides an illustration of multiple nozzles.

DETAILED DESCRIPTION

The following description sets forth numerous specific configurations, parameters, and the like. It should be recognized, however, that such description is not intended as a limitation on the scope of the present invention, but is instead provided as a description of exemplary embodiments.

A method and apparatus for washing a piece of produce are disclosed. In one embodiment, the produce washer includes a holder to position a piece of produce and a nozzle to direct a stream of cleansing liquid horizontally towards the piece of produce. The holder may be ring on which the piece of produce is placed, a basket that cradles the piece of produce, or a cone in which the piece of produce is inserted. A produce loading sub-system may be used to place the piece of produce on the produce washer as part of a produce preparation system. Various alternate embodiments of the produce washer may allow the nozzle to be positioned relative to the holder with multiple degrees of freedom.

FIG. 1 illustrates one embodiment of produce washer 100. In one embodiment, the produce washer may have a holder 110 to position a piece of produce. The piece of produce may be a cored head of lettuce, a head of cabbage, or a head of romaine lettuce. A nozzle 120 may be used to direct a cleansing liquid horizontally at the piece of produce. As depicted in FIG. 1, the nozzle 120 is disposed at a horizontal distance adjacent to the holder 110. A bar 130 may be used to position the holder 110 relative to the nozzle 120. A conveyor clamp 140 may be coupled to the holder 110 to clamp the produce washer to a conveyance system. In one embodiment, the nozzle 120 is held stationary relative to the holder 110. In an alternative embodiment, a motor system may be coupled to the nozzle 120 to move the nozzle in various directions while spraying the holder 110.

In one embodiment, when the piece of produce is a cored lettuce head, the cored lettuce head is loaded onto the holder 110 and positioned with the cored portion facing the nozzle 120 disposed across the horizontal distance. When the cored lettuce head is positioned in the holder 110, the nozzle 120 directs a stream of cleansing liquid across the horizontal distance into the cored portion. The cleaned, cored lettuce head is then unloaded from the holder 110.

FIG. 2 provides an illustration of one embodiment of a holder and bar 200. The holder 110 may be a ring upon which the piece of produce is placed. The ring may have a diameter of four inches or less. In one embodiment, the holder 110 and the bar 130 may be made of variety of materials, including plastic, metal, ceramic, vulcanized rubber, or other materials. In an alternative embodiment, the holder 110 and bar 130 may be made of different materials. The holder 110 may be coupled to the bar 130 by adhesives, welding, fasteners, or other coupling methods. In an alternative embodiment, the holder 110 may be coupled to the bar 130 by a pivot 210. The pivot 210 would allow the bar 130 to rotate around the holder 110, the nozzle 120 being able to revolve around the piece of produce and spray cleansing liquid horizontally on the piece of produce from multiple angles. The bar 130 may be of fixed length. Alternatively, the bar 130 may be able to telescope in length.

FIG. 3 provides an illustration of one embodiment of a nozzle support 300. A strut 310 may be coupled to a first sliding clamp 320. In one embodiment, the strut 310 and the first sliding clamp 320 may be made of variety of materials, including plastic, metal, ceramic, vulcanized rubber, or other materials. In an alternative embodiment, the strut 310 and first sliding clamp 320 may be made of different materials. Coupling methods may include welding, adhesives, fasteners, or other coupling methods. Alternately, the strut 310 and first sliding clamp 320 may be molded from a single piece. The first sliding clamp 320 allows the support to move along the bar 130 (FIG. 1) in a radial direction away from the holder 110 in a first degree of freedom in relation to the holder 110 (FIG. 1).

FIG. 4 provides an illustration of one embodiment of a nozzle attachment 400. The nozzle 120 may be inserted into a nozzle holder 410. The nozzle holder 410 may be coupled to a second sliding clamp 420. In one embodiment, the nozzle holder 410 and the second sliding clamp 420 may be made of variety of materials, including plastic, metal, ceramic, vulcanized rubber, or other materials. In an alternative embodiment, the nozzle holder 410 and second sliding clamp 420 may be made of different materials. Coupling methods may include welding, adhesives, a screw and washer, or other coupling methods. Alternately, the nozzle holder 410 and second sliding clamp 420 may be molded from a single piece. The second sliding clamp 420 allows the nozzle holder 410 to move along the strut 310 (FIG. 3) in a vertical direction away from the bar 130 (FIG. 1) in a second degree of freedom in relation to the holder 110 (FIG. 1). An additional support and clamp may be added to provide a third degree of freedom in relation to the holder 110 (FIG. 1).

A hose insert 430 may be coupled to the nozzle 120. The hose insert 430 may be inserted into a hose leading to a container of cleansing liquid. The cleansing liquid may be water, a water-chlorine solution, a water-protein solution, or other cleansing liquids. The cleansing liquid may be pumped from the container through the hose, the hose insert 430, and the nozzle 120 to spray the piece of produce in the holder 110 (FIG. 1). The nozzle 120 may be adjustable to allow different spray patterns, including a narrow spray or a wide, misting spray. The piece of produce may be pushed from the holder 110 (FIG. 1) by increasing the pressure of the cleansing liquid coming out of the nozzle.

FIG. 5 provides an illustration of a second embodiment of a produce washer 500. In this embodiment, the holder may be a basket 510. The basket 510 may encompass over 180 degrees of the piece of produce. Alternatively, the basket 510 may encompass less than 180 degrees of the piece of produce. In one embodiment, the basket 510 may be made of chicken wire. In an alternate embodiment, the basket 510 may be made of longitudinal strips of metal interlaced with latitudinal strips of metal. The basket may also be made of other materials, such as rubber, ceramic, plastics, or other materials. In a further embodiment, the basket 510 may also be coupled to the bar 130 by a pivot 210 (FIG. 2). The pivot 210 (FIG. 2) could allow the bar 130 to rotate around the basket 510, the nozzle 120 being able to revolve around the piece of produce and spray cleansing liquid horizontally on the piece of produce from multiple angles. By increasing the pressure of the cleansing liquid, the piece of produce may be pushed from the basket 510 into the next stage of production.

FIG. 6 provides an illustration of a third embodiment of a produce washer 600. In this embodiment, the holder may be a hollow cone 610. In one embodiment, the cone may be held in place by a cone support 620. The cone 610 may be positioned with the tapered end of the cone pointing towards the nozzle and the base of the cone 610 facing away from the nozzle. The piece of produce may be packed into the end facing away from the nozzle. A hole at the tapered end of the cone 610 may allow the cleansing liquid to be sprayed into the cone 610 from the nozzle 120, the cleansing liquid then washing the piece of produce. The cone 610 may be made of metal, rubber, ceramic, plastics, or other materials. In an alternative embodiment, the base of the cone 610 may face the nozzle 120, with a hole in the tapered end of the cone 610 to drain the cleansing liquid.

FIG. 7 provides an illustration of a fourth embodiment of a produce washer 700. In this embodiment, the holder may be a basket 710 having a rim portion 712 and support bars 714. In FIG. 7, the rim portion 712 is depicted as being substantially level with the horizon, but the rim portion 712 can also be angled. The support bars 714 are curved to support and hold the piece of produce when the piece of produce is sprayed by the nozzle 120. Additionally, in this embodiment, the produce washer 700 includes two clamps 140 to attach the produce washer 700 to a structure 720, such as to a conveyor system.

FIG. 8 provides an illustration of a fifth embodiment of a produce washer 800. In this embodiment, the holder may be a basket 820 having a rim portion 812 and support bars 712. As depicted in FIG. 8, the rim portion 812 is angled with a curved side and a lowered side. The curved side and the curved support bars 712 support and hold the piece of produce when the piece of produce is sprayed by the nozzle 120. The lowered side allows for easier access to basket 820 to place and remove the piece of produce. Additionally, in this embodiment, the nozzle 120 and bar 130 can be attached to a structure 820 using a clamp 140*a*, and the basket 820 can be attached to a structure 820 using another clamp 140*b*. The nozzle 120 and bar 130 can be connected to the basket 820 as a single assembly. Alternatively, the basket 820 can be a separate component from the nozzle 120 and bar 130.

FIG. 9 provides an illustration of using multiple nozzles 120*a* and 120*b*. As depicted in FIG. 9, nozzles 120*a* and 120*b* can be mounted on strut 310. As also depicted in FIG. 9, nozzles 120*a* and 120*b* can be oriented at an angle 910 to direct a cleansing liquid horizontally at the piece of produce.

The angle 910 can vary from a range of about positive 45 degrees to about negative 45 degrees relative to the horizon. In FIG. 9, nozzle 120a is depicted at a positive angle 910 relative to the horizon, and nozzle 120b is depicted at a negative angle 910 relative to the horizon. In an alternative embodiment, more than two nozzles can be used. Additionally, the nozzles can be mounted at a fixed angle 910 or adjustably mounted to allow angle 910 to be adjusted.

Although exemplary embodiments have been described, various modifications can be made without departing from the spirit and/or scope of the present invention. Therefore, the present invention should not be construed as being limited to the specific forms shown in the drawings and described above.

We claim:

1. A method of operating a mechanical produce washer to wash a cored lettuce head having a cored portion, the method comprising:
   loading the cored lettuce head onto a holder component of the mechanical produce washer with the cored portion facing a nozzle assembly disposed at a horizontal distance across from the holder component, the nozzle assembly having a nozzle;
   adjusting one or more sliding clamps to move the nozzle relative to the holder component, wherein the one or more sliding clamps are adjusted before or after loading the cored lettuce head onto the holder component;
   directing a stream of cleansing liquid across the horizontal distance into the cored portion with the nozzle assembly; and
   unloading the cored lettuce head from the holder component.

2. The method of claim 1, further comprising:
   adjusting the horizontal distance between the holder component and the nozzle in the nozzle assembly.

3. The method of claim 2, further comprising:
   adjusting an angle formed between the nozzle and the horizon.

4. The method of claim 1, further comprising:
   rotating the nozzle assembly relative to the holder component.

5. The method of claim 2, wherein the horizontal distance is adjusted by adjusting a first sliding clamp of the one or more sliding clamps, wherein the first sliding clamp is slid along a bar coupled to the holder component.

6. The method of claim 5, further comprising:
   adjusting a vertical distance between the holder component and the nozzle in the nozzle assembly.

7. The method of claim 6, wherein the vertical distance is adjusted by adjusting a second sliding clamp of the one or more sliding clamps, wherein the second sliding clamp is slid along a strut coupled to the bar.

8. The method of claim 1, wherein the holder component includes a rim portion and support bars, wherein the support bars are curved to support and hold the cored lettuce head.

9. A method of washing a cored lettuce head having a cored portion using a mechanical produce washer, the method comprising:
   loading the cored lettuce head onto a holder component of the mechanical produce washer with the cored portion facing a nozzle disposed at a horizontal distance across from the holder component;
   adjusting one or more sliding clamps to move the nozzle relative to the holder component, wherein the one or more sliding clamps are adjusted before or after loading the cored lettuce head onto the holder component;
   directing a stream of cleansing liquid across the horizontal distance into the cored portion with the nozzle;
   unloading the cored lettuce head from the holder component; and
   placing the cored lettuce head from the holder component onto a conveyer.

10. The method of claim 9, wherein adjusting one or more sliding clamps comprises:
    adjusting a first sliding clamp of the one or more sliding clamps to adjust the horizontal distance between the holder component and the nozzle, wherein the first sliding clamp is slid along a bar coupled to the holder component.

11. The method of claim 10, wherein adjusting one or more sliding clamps comprises:
    adjusting a second sliding clamp of the one or more sliding clamps to adjust a vertical distance between the holder component and the nozzle, wherein the second sliding clamp is slid along a strut coupled to the bar.

12. The method of claim 9, further comprising: adjusting a pivot to adjust an angle formed between the nozzle and the horizon.

13. The method of claim 9, wherein the holder component includes a rim portion and support bars, wherein the support bars are curved to support and hold the cored lettuce head.

14. A method of washing a cored lettuce head having a cored portion using a mechanical produce washer, the method comprising:
    loading the cored lettuce head onto a holder component of the mechanical produce washer with the cored portion facing a nozzle disposed at a horizontal distance across from the holder component;
    adjusting a first sliding clamp to adjust the horizontal distance between the holder component and the nozzle, wherein the first sliding clamp is slid along a bar coupled to the holder component;
    adjusting a second sliding clamp to adjust a vertical distance between the holder component and the nozzle, wherein the second sliding clamp is slid along a strut coupled to the bar, and wherein the first and second clamps are adjusted before or after loading the cored lettuce head onto the holder component;
    directing a stream of cleansing liquid across the horizontal distance into the cored portion with the nozzle; and
    unloading the cored lettuce head from the holder component.

15. The method of claim 14, further comprising:
    adjusting a pivot to adjust an angle formed between the nozzle and the horizon.

16. The method of claim 15, wherein the angle includes a range between about positive 45 degrees to about negative 45 degrees relative to the horizon.

17. The method of claim 15, wherein the pivot couples the bar to a holder for the nozzle.

18. The method of claim 17, wherein the first sliding clamp is coupled to the strut, and wherein the second sliding clamp is coupled to the holder.

19. The method of claim 14, wherein the holder component includes a rim portion and support bars, wherein the support bars are curved to support and hold the cored lettuce head.

20. The method of claim 14, further comprising:
    placing the cored lettuce head from the holder component onto a conveyer.

* * * * *

UNITED STATES PATENT AND TRADEMARK OFFICE
CERTIFICATE OF CORRECTION

PATENT NO. : 7,484,514 B2 Page 1 of 1
APPLICATION NO. : 11/869613
DATED : February 3, 2009
INVENTOR(S) : John Y. Bryce et al.

It is certified that error appears in the above-identified patent and that said Letters Patent is hereby corrected as shown below:

On the Cover Page:

At page 1, (54), the title is spelled incorrectly. Please correct title to read as follows:

-- WASHING A CORED LETTUCE HEAD --

Signed and Sealed this

Seventh Day of April, 2009

JOHN DOLL
*Acting Director of the United States Patent and Trademark Office*

UNITED STATES PATENT AND TRADEMARK OFFICE
CERTIFICATE OF CORRECTION

| | |
|---|---|
| PATENT NO. | : 7,484,514 B2 |
| APPLICATION NO. | : 11/869613 |
| DATED | : February 3, 2009 |
| INVENTOR(S) | : John Y. Bryce et al. |

It is certified that error appears in the above-identified patent and that said Letters Patent is hereby corrected as shown below:

On the Cover Page, Item (54) and Column 1, line 1

The title is spelled incorrectly. Please correct title to read as follows:

-- WASHING A CORED LETTUCE HEAD --

This certificate supersedes the Certificate of Correction issued April 7, 2009.

Signed and Sealed this

Twenty-eighth Day of April, 2009

JOHN DOLL
*Acting Director of the United States Patent and Trademark Office*